US 6,724,538 B2

(12) United States Patent
Kushida et al.

(10) Patent No.: US 6,724,538 B2
(45) Date of Patent: Apr. 20, 2004

(54) HEAD-UP DISPLAY FOR A MOTORCYCLE HAVING A HORIZONTAL STRIPE OR LINEAR PATTERN IN A PERIPHERAL FIELD OF VIEW OF A SCREEN

(75) Inventors: Kazumitsu Kushida, Saitama (JP); Norihiro Kurata, Saitama (JP); Sadanao Ichimi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/824,231

(22) Filed: Apr. 3, 2001

(65) Prior Publication Data

US 2002/0126391 A1 Sep. 12, 2002

(30) Foreign Application Priority Data

Apr. 3, 2000 (JP) .......................... 2000-101490

(51) Int. Cl.$^7$ .............................................. G02B 27/14
(52) U.S. Cl. ....................................................... 359/630
(58) Field of Search ................................ 359/630–633; 345/7

(56) References Cited

U.S. PATENT DOCUMENTS

| | | | | |
|---|---|---|---|---|
| 4,925,272 A | * | 5/1990 | Ohshima et al. | ............ 359/630 |
| 4,988,976 A | * | 1/1991 | Lu | ............................ 359/630 |
| 5,243,417 A | * | 9/1993 | Pollard | ...................... 348/118 |
| 6,014,117 A | * | 1/2000 | Hennessy et al. | ........... 359/630 |

FOREIGN PATENT DOCUMENTS

| | | | | |
|---|---|---|---|---|
| EP | 0338703 A1 | * | 10/1989 | ........... G02B/27/00 |
| EP | 0338703 | | 10/1989 | |
| JP | A2 21660 0 | | 8/1990 | |
| WO | 8903059 | | 4/1989 | |
| WO | WO 8903059 | * | 6/1989 | ........... G02B/27/00 |

OTHER PUBLICATIONS

Mullins et al., "A Systems Approach to the Development of an Integrated Collision Avoidance Vehicle," Automotive Engineering, Jun. 1995, 4 pp., vol. 103, No. 6, Warrendale, Pennsylvania.

* cited by examiner

*Primary Examiner*—Georgia Epps
*Assistant Examiner*—Alicia M Harrington
(74) *Attorney, Agent, or Firm*—Birch, Stewart, Kolasch & Birch, LLP

(57) ABSTRACT

A head-up display is provided which is suitable for a motorcycle. An image is present in peripheral fields outside a 90% center field. In the case where the image is located outside the 90% center field, it does not obstruct driving of the vehicle, and in the case where the image is located in the peripheral fields, it allows a driver to dimly see the shape of the image and thereby recognize the presence of the image. For this reason, the image is located in the peripheral fields. Since an image is located in a peripheral field, the presence of the image can be recognized by a driver while not obstructing a desirable visibility to the front side of the driver. The driver can recognize, on the basis of the presence or absence of the image, whether or not attention should be taken to drive the vehicle.

22 Claims, 6 Drawing Sheets

HEAD-UP DISPLAY FOR A MOTORCYCLE HAVING A HORIZONTAL STRIPE OR LINEAR PATTERN IN A PERIPHERAL FIELD OF VIEW OF A SCREEN

BACKGROUND OF THE INVENTION

1. Field of the Invention

The present invention relates to a head-up display for a two-wheeled motorcycle.

2. Description of the Background Art

Various methods of allowing a running vehicle to detect the presence of another movable body such as a vehicle approaching thereto have been proposed. For example, Japanese Patent Laid-open No. Hei 2-216600 entitled "Traffic Accident Prevention Method" describes a method of preventing a traffic accident of a relatively large vehicle having three or more wheels. According to this method, a receiver is mounted on the relatively large vehicle, wherein the receiver receives warning radio waves transmitted from a transmitter of another movable body, detects the presence of the movable body, and informs a driver of the detected result. This document does not describe a specific means of informing a driver of a warning state. Such a means is generally realized by an acoustic transmission method or an optical transmission method. One example using a head-up display, which is based on the optical transmission method, will be described below.

FIG. 8 is a view illustrating a four-wheeled vehicle provided with a prior art head-up display. A head-up display 100 includes a projector 102 built in an instrument panel 101. The projector 102 projects an image 104 on a plane, on the inner side of the vehicle, of a front window glass 103. The image 104 allows a driver to look therethrough, because the image 104 does not obstruct the visibility to the front side of the driver.

The techniques disclosed in the above-described document and shown in FIG. 8 are those applied to three-wheeled or four-wheeled vehicles. However, problems occur if the above-described head-up display is provided on a two-wheeled motorcycle different from a three-wheeled vehicle or four-wheeled vehicle.

Since a three-wheeled vehicle or four-wheeled vehicle is kept in a stable posture during running, it puts less burden on a driver, since the driver does not have to direct attention to preventing the three-wheeled vehicle or four-wheeled vehicle from turning over. However, since a motorcycle must be driven with its balance maintained during running, it puts a relatively large burden on a driver in order not to be turned over. From this viewpoint, it is difficult to mount a head-up display, which is designed for a three or four-wheeled vehicle, on a motorcycle.

SUMMARY OF THE INVENTION

It is therefore an object of the present invention to provide a head-up display suitable for a motorcycle. To achieve the above object, a head-up display for a motorcycle is provided which is adapted to inform a driver of traffic information by means of an image projected on a screen provided in front of a riding position of a driver. A visual field for a driver on the motorcycle and looking forwardly is divided into a central field and a peripheral field surrounding the central field. The image is located in the peripheral field on the screen.

The central field is defined such that an object in this field is clearly visible, and the peripheral field is defined such that an object in this field is dimly visible. Since the image is located in the peripheral field, the presence of the image can be recognized by a driver while not obstructing a desirable visibility to the front side of the driver. The driver can recognize, on the basis of the presence or absence of the image, whether or not attention should be directed to drive the vehicle.

The image may located at a central position of the peripheral field or a position offset to the central field from the central position of the peripheral field. With this configuration, the presence of the image located at a central position of the peripheral field or a position offset to the central field from the central position can be more easily recognized by a driver as compared with an image located at a position other than that described above.

The image may have a stripe or linear pattern. With this configuration, the presence of the image having a stripe or linear pattern can be more easily recognized by a driver as compared with an image having a dot pattern. The image having a stripe or linear pattern can be easily formed by a collection of dots. Accordingly, this configuration is advantageous in terms of production cost.

The image may have a stripe or linear pattern extending in the horizontal direction, and a length of the image is determined so that an angle formed between two lines extending from a point in the central field to both ends of the image becomes at least 20°.

An image having a pattern extending longer in the vertical direction tends to easily enter the eyes of a driver and thereby interfere with the driver's view when the driver's eyes move right and left. Since the image has a pattern extending longer in the horizontal direction, it does not interfere with the driver's view when the driver's eyes move right and left, and further, since an angle formed between two lines extending from a point in the central field to both ends of the image is set to at least 20°, the visibility can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
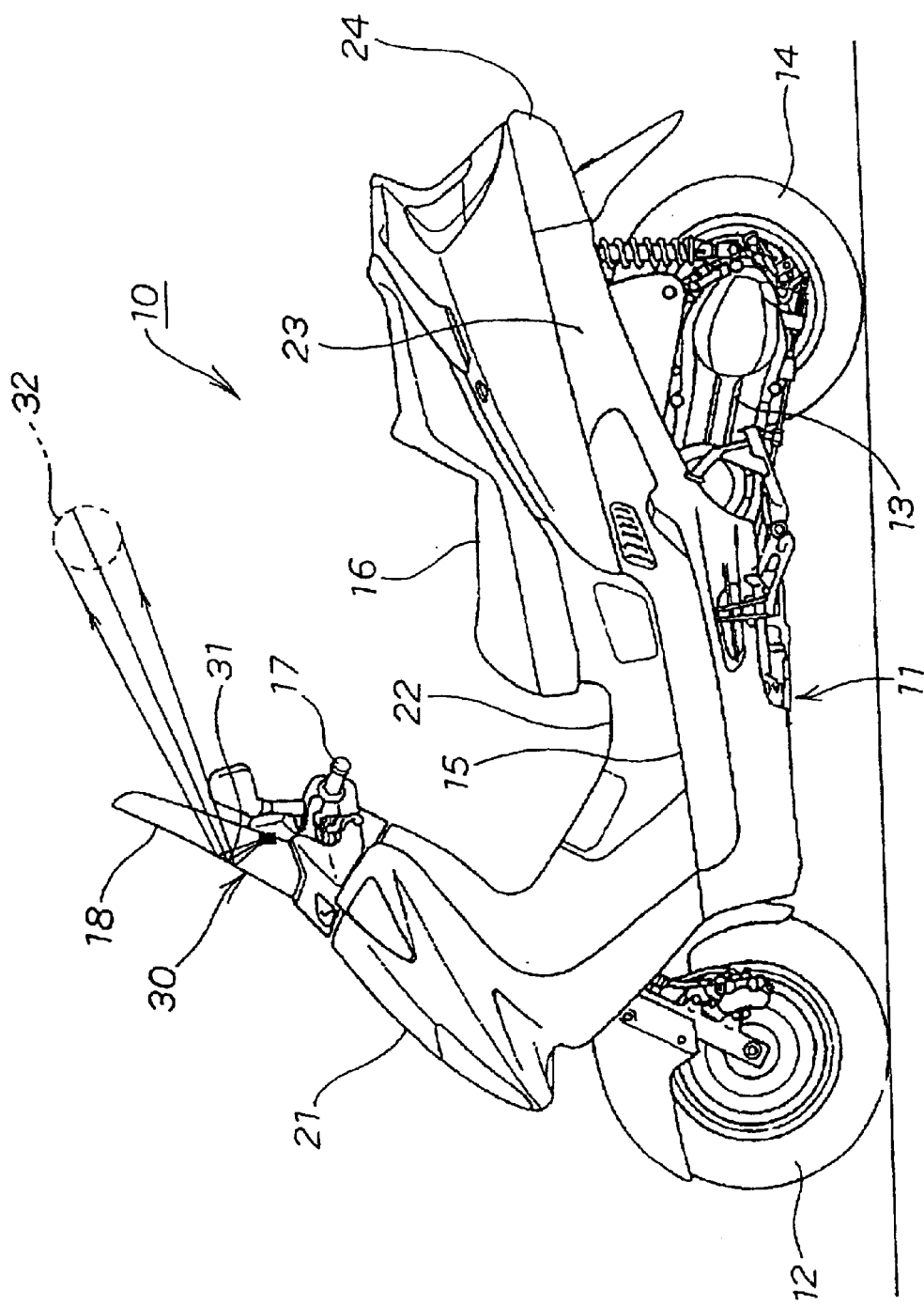
FIG. 1 is a side view of a motorcycle to which the present invention is applied.

An embodiment of the present invention will be described with reference to the accompanying drawings. FIG. 1 is a side view of a motorcycle to which the present invention is applied. A scooter-type motorcycle 10, which is representative of the motorcycle according to the present invention, is configured such that a front wheel 12 is provided on a front portion of a vehicular body 11. A rear wheel 14 as a drive wheel is vertically movably mounted on a rear portion of the vehicular body 11 via a power swing unit 13. Steps 15 are disposed on both sides of a lower central portion of the vehicular body 11. A tandem seat 16 is disposed on an upper portion of the vehicular body 11. A steering handle 17 is disposed on the front portion of the vehicular body. A transparent windshield 18 serving as an image screen is raised from the steering handle 17. The vehicular body 11 is covered with covers such as a front cover 21, a center cover 22, side covers 23, and a rear center cover 24.

The motorcycle 10 includes a head-up display 30, which will be described in detail later, wherein an image 31 projected by the head-up display 30 is allowed to be viewed by a driver at an eye position 32 shown by an imaginary line.

Figure 2:
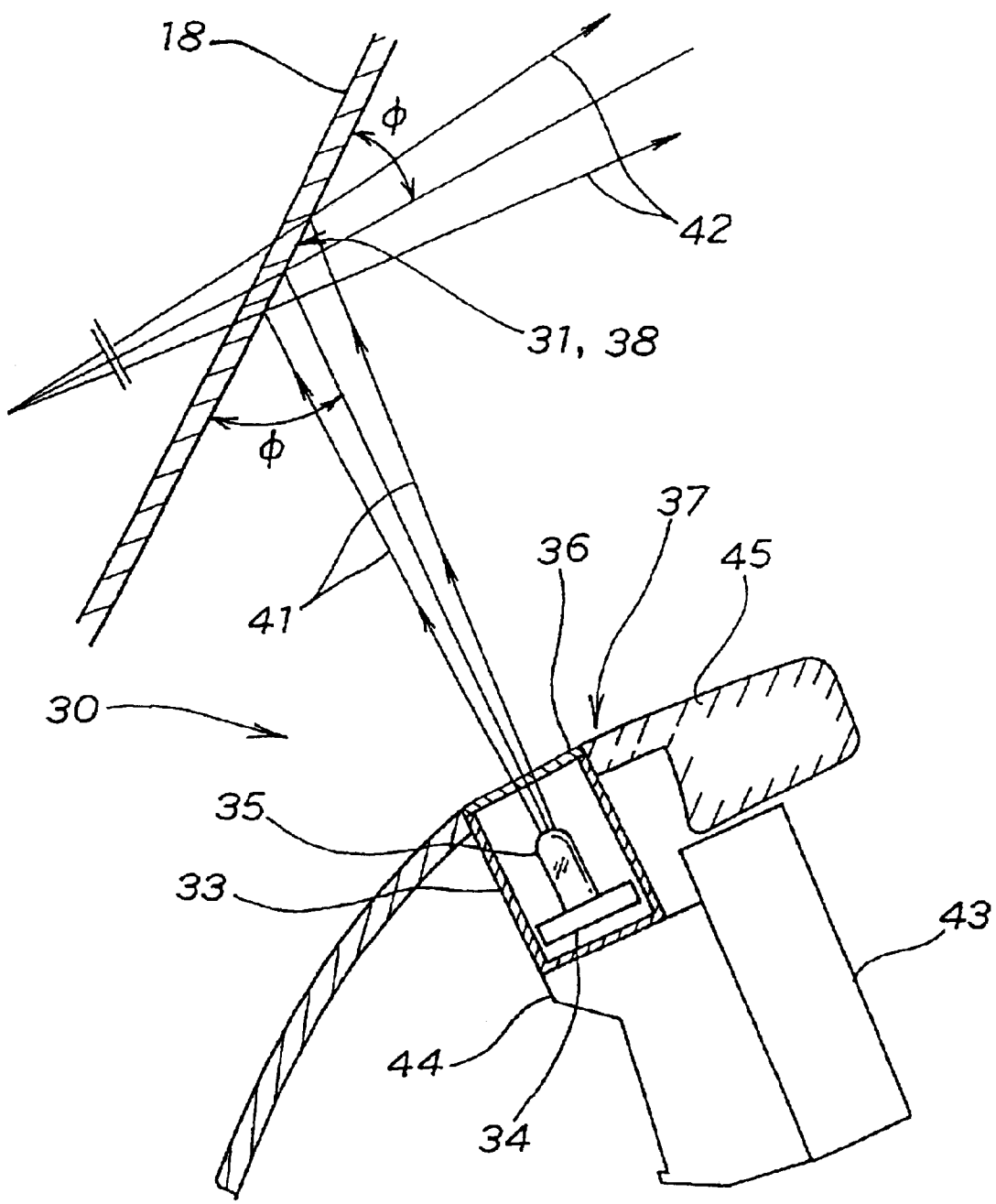
FIG. 2 is a view showing the principle of a head-up display for a motorcycle according to the present invention.

FIG. 2 is a view showing the principle operation of the head-up display for a motorcycle according to the present invention. The head-up display 30 includes a projector 37 and a projection screen 38 composed of an inner surface, on the driver side, of the window shield 18. The projector 37 is formed by putting a circuit board 34 and a plurality of light emitting devices 35 arranged in series in the direction perpendicular to the paper plane of FIG. 2 in a case 33, and closing the case 33 with a lens 36. In this head-up display 30 having such a configuration, light rays 41 emitted from the light emitting devices 35 of the projector 37 are made obliquely incident on the projection screen 38 of the windshield 18 at an angle $\phi$, and reflected from the projection screen 38 at the same angle $\phi$. The reflected light rays 42 travel toward the eye position described with reference to FIG. 1.

The projection screen 38 having a sufficient reflecting function can be obtained by forming the windshield 18 from a colorless, transparent material or a colored, transparent material. Alternatively, the projection screen 38 may be configured as a screen, called a half mirror, having a transparent function serving as a reflection function. The half mirror treatment can be easily performed by vapor-depositing a thin film made from a metal oxide on the windshield 18.

The projector 37 is placed on a terrace 44 extending from a back surface of a meter 43 and is covered, together with the meter 43, with a meter cover 45. With this configuration, the projector 37 can be protected by the meter cover 45 for protecting the meter 43.

A relationship between the image 31 formed by the head-up display 30 and a visual field for a driver will be hereinafter described in detail.

Figure 3:
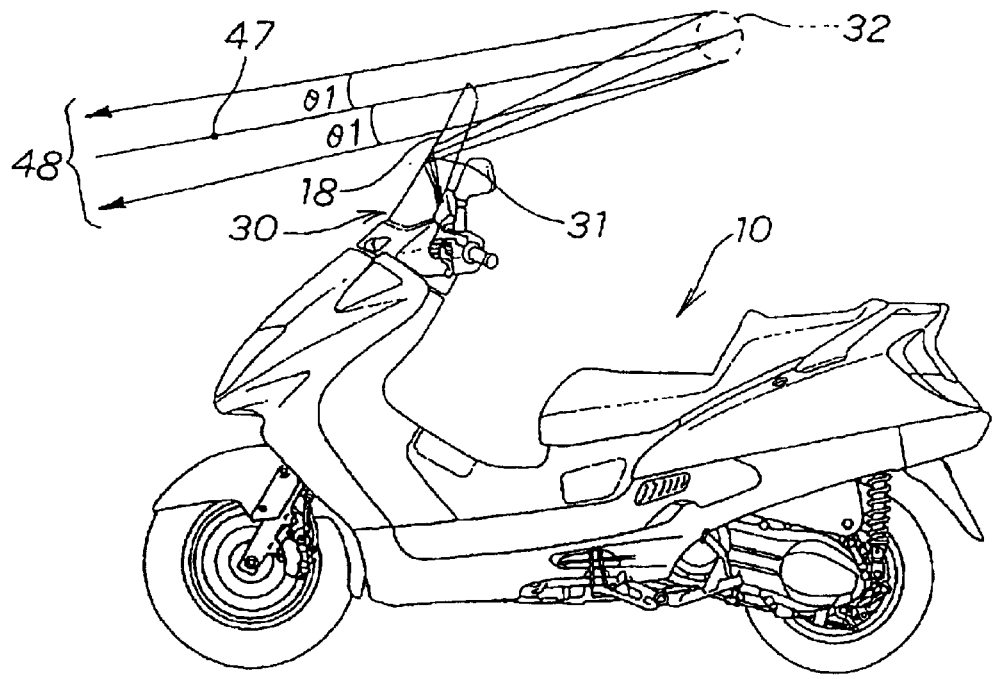
FIG. 3 is a view illustrating a central field of a visual field for a driver riding on the motorcycle according to the present invention.

FIG. 3 is a view illustrating a central field, which is defined as a clearly visible region of a visual field for a driver riding on the motorcycle according to the present invention. During running of the motorcycle 10, the driver whose eyes are located at the eye position 32 sees the front side with his or her visual line tilted slightly downwardly. As is well-known, if a visual line of a human being (whose eyes are assumed to be located at the eye position 32) is offset from the center of the visual field by a small angle $\theta 1$ (about 3°), the visual acuity is rapidly reduced.

A region surrounded by two lines offset from a center line 47 of the visual field by the angle $\pm \theta 1$ becomes the clearly visible center field. The field center line 47 and the center field differ depending on differences (for example, body dimensions) between a large number of drivers. A center field capable of covering 90% of a large number of drivers is referred to as a "90% center field". Accordingly, in FIG. 2, the region surrounded by the two lines offset from the field center line 47 by the angle $2 \times \theta 1$ becomes the 90% center field 48. The 90% center field 48 is positioned over the image 31.

Figure 4:
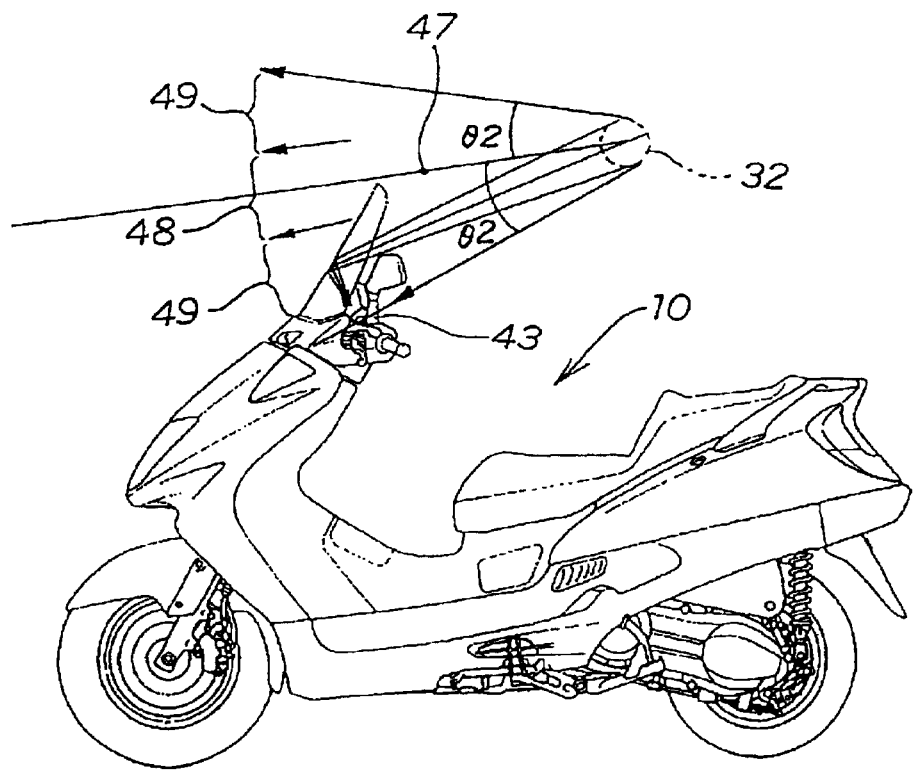
FIG. 4 is a view illustrating a peripheral field of the visual field for a driver riding on the motorcycle according to the present invention.

FIG. 4 is a view illustrating a peripheral field, which is defined as a dimly visible region of a visual field for a driver riding on the motorcycle 10. During running of the motorcycle 10, the driver whose eyes are located at the eye position 32 dimly sees an object in a region surrounded by two lines offset from the field center line 47 by the angle $\pm \theta 2$, which region is located to cover the 90% center field 48. Both portions, located outside the 90% center field, of this region are called peripheral fields 49. The angle $\theta 2$, which defines the peripheral field 49, is known as about 75°. However, since a driver riding on a motorcycle wears a helmet on his or her head, the angle $\theta 2$ must be made slightly small as shown in FIG. 4 in order that an edge and a brim of the helmet does not interfere with the peripheral field 49. The peripheral fields 49, however, are sufficiently wide to the extent that the bottom edge of the peripheral fields 49 is overlapped to the meter 43.

Figure 5:
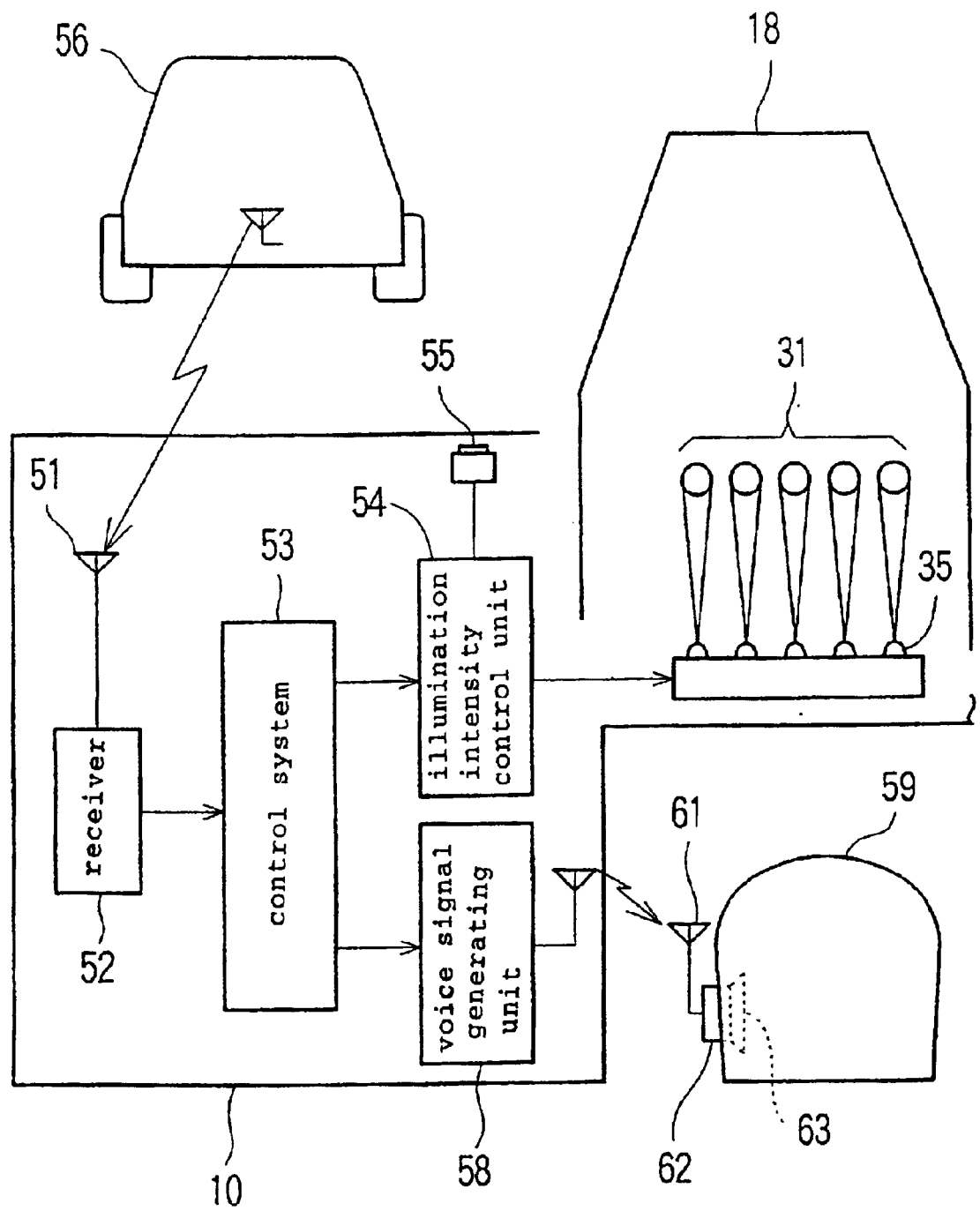
FIG. 5 is a view showing the principle of control of the head-up display of the present invention.

FIG. 5 is a view showing the principle of control of the head-up display of the present invention. The motorcycle 10 includes an antenna 51, a receiver 52, a control system 53, an illumination intensity control unit 54, and an illumination intensity sensor 55. The receiver 52 receives radio waves transmitted from another movable body 56 via the antenna 51, and the control system 53 analyzes the information thus received. If it is determined by the control system 53 that the movable body 56 is present and moving in the direction facing or crossing the moving direction of the vehicle concerned, the light emitting devices 35 are turned on via the illumination intensity control unit 54. At this time, a horizontal row of the images 31 emerge on the windshield or windscreen 18. At the same time, the control system 53 transmits a voice signal by radio transmission via a voice signal generating unit 58. A miniature receiver 62 receives the voice signal via a miniature antenna 61 additionally provided on a helmet 59, and a speaker 63 built in the helmet 59 generates an alarm sound.

The illumination intensity sensor 55 detects an intensity of illumination in the surroundings, and the illumination intensity control unit 54 adjusts an output of each of the light emitting devices 51 on the basis of a detection signal, to adjust the brightness of the images 31. With this adjustment, the images 31 are made visible in cloudless or cloudy weather, or at night.

In this embodiment, the receiver 52 receives a signal transmitted from the movable body 56 and the control system 53 recognizes the presence of the movable body 56. The receiver 52, however, can receive a warning signal which is transmitted from means fixed on the ground, such as a traffic control sign or a guard rail, along a general road. Such various kinds of transmission information are generally referred to as traffic information.

Figure 6:
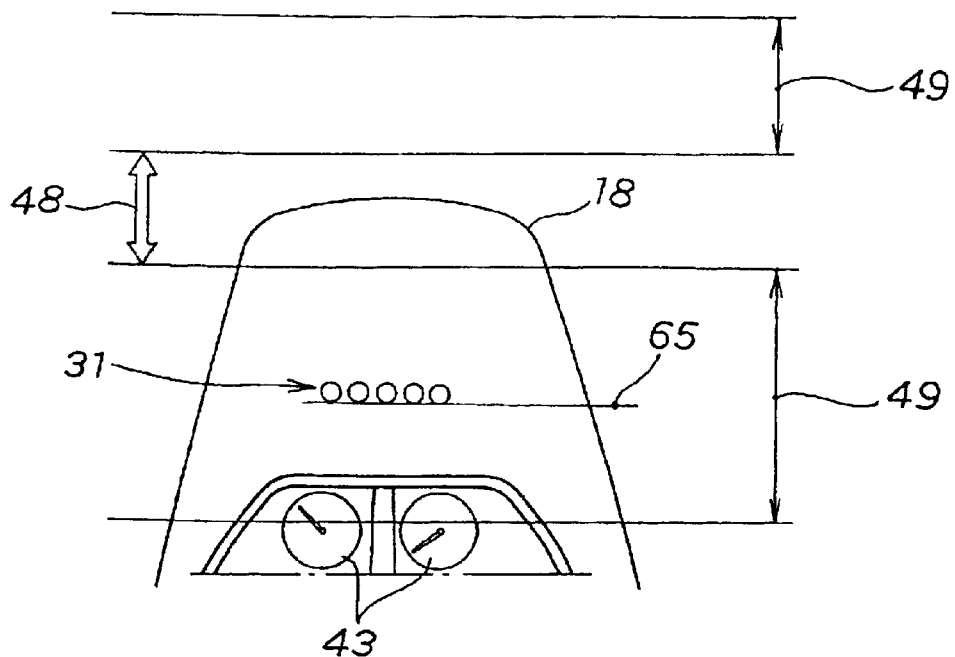
FIG. 6 is a view, seen from the driver side, of an image formed on a screen of a windshield.

FIG. 6 is a view, seen from the driver side, of the image formed on the windshield 18. As described with reference to FIGS. 3 and 4, the 90% center field 48 is present in the vicinity of an upper edge of the windshield 18, and the large peripheral fields 49 are present on the upper and lower sides of the center field 48.

According to this embodiment, it is important that the image 31 is present in the peripheral fields 49 outside the 90% center field 48.

In the case where the image 31 is located outside the 90% center field 48, it does not obstruct the drive of the vehicle, and in the case where the image 31 is located in the peripheral fields 49, it allows a driver to dimly see the shape of the image 31 and thereby recognize the presence of the image 31. For this reason, the image 31 is located in the peripheral fields 49.

Preferably, the image 31 is located in one of the peripheral fields 49 at a central position 65 or a position offset to the center field 48 from the central position 65. The reason for this is that the image 31, which is located in the dimly visible peripheral filed 49, particularly, at the central position 65 or a position offset to the center field 48 from the central position 65, can be more easily recognized by a driver.

In this embodiment, the image 31 is configured to have a stripe or linear pattern composed of a plurality of dots, for example, five. The image 31 may have a pattern of dots each of which is formed into a shape similar to a silhouette of a car or a truck. However, in the case where the pattern is complicated, it is necessary to prepare a complicated, expensive projector for forming the image 31 having such a complicated pattern. Further, if the image 31 having a complicated pattern is located in the peripheral field 49, a driver cannot identify the detail of the complicated pattern of the image 31. From this viewpoint, the image 31 may have a stripe or linear pattern formed by arranging a plurality of dots. The image 31 having a stripe or linear pattern is easier to recognize by a driver as compared with the image 31 having a dot pattern. Additionally, the image 31 having a stripe or linear pattern is advantageous in production cost because it can be easily formed by a collecting dots.

Figure 7:
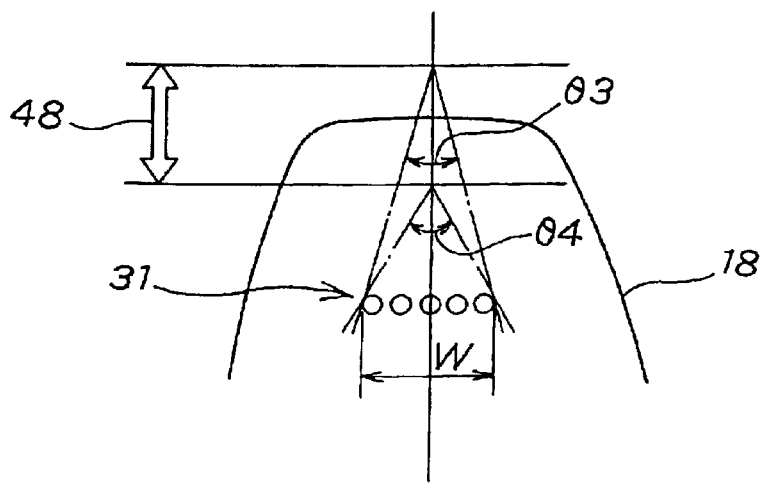
FIG. 7 is a view of an image formed according to the present invention.
Figure 8:
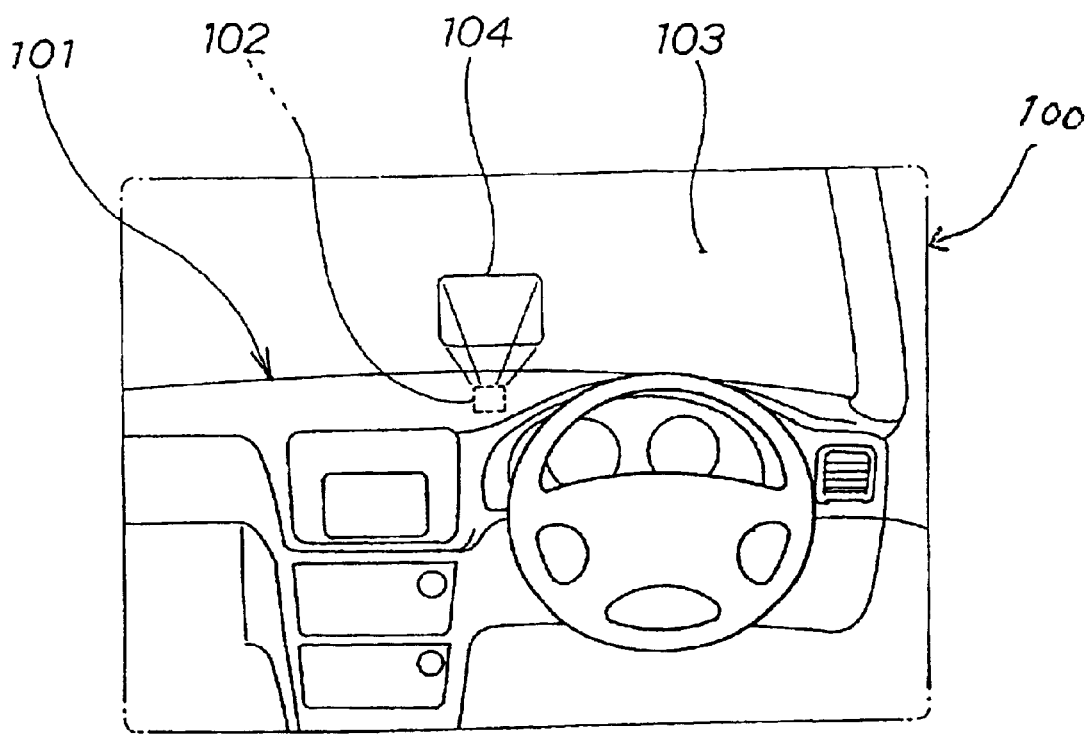
FIG. 8 is a view illustrating a four-wheeled vehicle including a prior art head-up display.

FIG. 7 is a view illustrating the image formed according to the present invention. As a result of examination by the present inventors, it has been found that even in the case where an image is present in the peripheral field 49, if the image is small, it is difficult for a driver riding on the running motorcycle to recognize such an image. From this viewpoint, the running experiments have been repeated, and eventually it has been found that as shown in FIG. 7, letting an angle formed between two lines extending from an uppermost point of the center field 48 to both ends of an image be θ3, and an angle formed between two lines extending from a lowermost point of the center field 48 to both the ends of the image be θ4, if each of the angles θ3 and θ4 is 20° or more, the image can be desirably recognized by a driver. Here, as is apparent from this figure, the angle θ3 is smaller than the angle θ4. Accordingly, a width W of the image 31 may be set so that the angles θ3 and θ4 satisfy a relationship of 20°≦θ3<θ4. The width W can be easily set by adjusting the configuration (for example, the dimension in the direction perpendicular to the paper plane of FIG. 2 and the number of the light emitting devices 35) of the projector 37 shown in FIG. 2.

In this way, one specific feature of this embodiment is that the image has a stripe or linear pattern extending in the horizontal direction and the length (width W) of the image is determined so that an angle formed between two lines extending from a point in the central field to both ends of the image becomes at least 20°.

An image having a pattern extending longer in the vertical direction tends to easily enter the eyes of a driver and thereby interfere with the driver's view when the driver moves his or her eyes right and left. According to the above feature, however, since the image has the pattern extending longer in the horizontal direction, it does not interfere with the driver's view when the driver moves the eyes right and left. Further, since an angle formed between two lines extending from a point in the central field to both ends of the image is set to at least 20°, the visibility can be enhanced.

In the above-described embodiment, the motorcycle to which the present invention has been applied is represented by a scooter-type motorcycle. However, the present invention may also be utilized on a saddle-seat motorcycle.

In the above-described embodiment, the windshield is used for the projection screen. However, any member may be used for the projection screen insofar as an image can be projected thereon. However, if a motorcycle includes a windshield, the use of the windshield as the projection screen is preferable in terms of reduction in the number of parts. Further, in the above-described embodiment, the projection screen is provided in front of a riding position of a driver. However, it may be provided at an arbitrary position.

The present invention having the above-described configuration exhibits several beneficial effects. The invention provides a head-up display for a motorcycle, which is adapted to inform a driver of traffic information by means of an image projected on a screen provided in front of a riding position of a driver. When a visual field for a driver who takes a riding posture and turns his or her eyes to the front side is divided into a central field and a peripheral field surrounding the central field, the image is located in the peripheral field on the windscreen. With this configuration, since the image is located in the peripheral field, the presence of the image can be recognized by a driver while not obstructing a desirable visibility to the front side of the driver. The driver can recognize, on the basis of the presence or absence of the image, whether or not attention should be taken to drive the vehicle. Accordingly, the head-up display according to the invention is suitable for a motorcycle.

The invention is characterized in that the image is located at a central position of the peripheral field or a position offset to the central field from the central position of the peripheral field. With this configuration, the presence of the image located at a central position of the peripheral field or a position offset to the central field from the central position can be more easily recognized by a driver as compared with an image located at a position other than that described above.

The invention is characterized in that the image has a stripe or linear pattern. With this configuration, the presence of the image having a stripe or linear pattern can be more easily recognized by a driver as compared with an image having a dot pattern. The image having a stripe or linear pattern can be easily formed by a collection of dots. Accordingly, this configuration is advantageous in terms of production cost.

The invention is characterized in that the image has a stripe or linear pattern extending in the horizontal direction, and a length of the image is determined so that an angle formed between two lines extending from a point in the central field to both ends of the image becomes at least 20°. An image having a pattern extending longer in the vertical direction tends to easily enter the eyes of a driver and thereby interfere with the driver's view when the driver's eyes move right and left. According to the configuration of the invention, however, since the image has a pattern extending longer in the horizontal direction, it does not interfere with the driver's view when the driver's eyes move right and left. Further, since an angle formed between two lines extending from a point in the central field to both the ends of the image is set to at least 20°, the visibility can be enhanced.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A head-up display for a motorcycle, which is adapted to inform a driver of traffic information by display of an image projected on a screen provided in front of a riding position of a driver, wherein when a visual field for a driver who takes a riding posture and turns his or her eyes to the front side is divided into a central field and a peripheral field surrounding said central field, said image is located in said peripheral field on said screen, and wherein said image is a stripe or linear pattern extending in a horizontal direction, wherein a width of said image in said horizontal direction is determined so that an angle formed between two lines extending from a point in said central field to both ends of said image becomes at least 20°.

2. The head-up display for a motorcycle according to claim 1, wherein said image is located at a central position of said peripheral field or a position offset to said central field from the central position of said peripheral field.

3. The head-up display for a motorcycle according to claim 1, wherein the width of said image in said horizontal direction satisfies a relationship of 20°≦θ3<θ4, where:
   θ3 is an angle formed between two lines extending from an uppermost point of said central field to both ends of said image; and
   θ4 is an angle formed between two additional lines extending from a lowermost point of said central field to said both ends of said image.

4. The head-up display for a motorcycle according to claim 1, further comprising a projector which produces said image.

5. The head-up display for a motorcycle according to claim 4, wherein said projector comprises a plurality of light sources aligned in a row.

6. The head-up display for a motorcycle according to claim 4, wherein said projector comprises:
   a plurality of light sources;
   a substrate on which said light sources are mounted;
   a case in which said substrate is located; and
   a lens covering a portion of said case through which light emitted from said light sources passes.

7. The head-up display for a motorcycle according to claim 6, wherein the width of said image in said horizontal direction satisfies a relationship of 20°≦θ3<θ4, where:
   θ3 is an angle formed between two lines extending from an uppermost point of said central field to both ends of said image; and
   θ4 is an angle formed between two additional lines extending from a lowermost point of said central field to said both ends of said image.

8. The head-up display for a motorcycle according to claim 1, wherein said screen is a windscreen for the motorcycle, and wherein said windscreen has upper, right, left and bottom side peripheral fields surrounding said central field, and wherein said image is located in said bottom side peripheral field.

9. The head-up display for a motorcycle according to claim 1, wherein the traffic information indicates at least one of an approaching vehicle, traffic control signal or guard rail.

10. A head-up display for a motorcycle, comprising:
    a projector which produces an image; and
    a screen on which said image is displayed, said screen having a peripheral portion located in a peripheral field of view of a driver, said peripheral field of view being an area outside of a central field of view of the driver, said central field of view extending approximately 6 degrees in a vertical direction as defined for 90% of all drivers in a riding posture on the motorcycle,
    wherein said image is displayed in said peripheral field of view, and wherein said image is a stripe or linear pattern extending in a horizontal direction, wherein a width of said image in said horizontal direction is determined so that an angle formed between two lines extending from a point in said central field to both ends of said image becomes at least 20°.

11. The head-up display for a motorcycle according to claim 10, wherein said projector comprises a plurality of light sources aligned in a row.

12. The head-up display for a motorcycle according to claim 10, wherein said projector comprises:
    a plurality of light sources;
    a substrate on which said light sources are mounted;
    a case in which said substrate is located; and
    a lens covering a portion of said case through which light emitted from said light sources passes.

13. The head-up display for a motorcycle according to claim 10, wherein said image is located at a central position of said peripheral field of view.

14. The head-up display for a motorcycle according to claim 10, wherein the width of said image in said horizontal direction satisfies a relationship of 20°≦θ3<θ4, where:
    θ3 is an angle formed between two lines extending from an uppermost point of said central field of view to both ends of said image; and
    θ4 is an angle formed between two additional lines extending from a lowermost point of said central field of view to said both ends of said image.

15. The head-up display for a motorcycle according to claim 14, wherein said projector comprises:
    a plurality of light sources;
    a substrate on which said light sources are mounted;
    a case in which said substrate is located; and
    a lens covering a portion of said case through which light emitted from said light sources passes.

16. The head-up display for a motorcycle according to claim 15, wherein said plurality of light sources are aligned in a row.

17. The head-up display for a motorcycle according to claim 16, wherein said image is located at a central position of said peripheral field of view.

18. The head-up display for a motorcycle according to claim 10, wherein said screen is a windscreen for the motorcycle, and wherein said windscreen has upper, right, left and bottom side peripheral fields surrounding said central field, and wherein said image is located in said bottom side peripheral field.

19. A head-up display for a motorcycle, comprising:

a receiver for receiving traffic information from a transmitter of at least one of a vehicle or a device fixed to the ground along a roadway;

a control system connected to said receiver;

a projector connected to said control system, which produces an image when said control system determines that certain traffic information has been received by said receiver; and a screen on which said image is displayed, wherein said image is displayed in a peripheral field of view, and wherein said image is a stripe or linear pattern extending in a horizontal direction, wherein a width of said image in said horizontal direction is determined so that an angle formed between two lines extending from a point in a central field to both ends of said image becomes at least 20°.

20. The head-up display for a motorcycle according to claim 19, wherein said image produced by said projector warns the driver of an approaching vehicle, traffic control signal, or guard rail.

21. The head-up display for a motorcycle according to claim 19, wherein said image is a horizontal row of circular images.

22. The head-up display for a motorcycle according to claim 19, further comprising:

an audio signal transmitter connected to said control system, wherein said audio signal transmitter transmits a signal for reception and reproduction by a speaker in a helmet of the driver to audibly warn the driver when said control system determines that certain traffic information has been received by said receiver.

* * * * *